Sept. 1, 1964 A. C. ALLEN 3,146,594
SPEED GOVERNOR

Filed March 23, 1961 2 Sheets-Sheet 1

INVENTOR
ARTHUR C. ALLEN

By *William J. Newman*
ATTORNEY

Sept. 1, 1964  A. C. ALLEN  3,146,594
SPEED GOVERNOR
Filed March 23, 1961  2 Sheets-Sheet 2

INVENTOR
ARTHUR C. ALLEN

BY *William J. Newman*
ATTORNEY

United States Patent Office 3,146,594
Patented Sept. 1, 1964

3,146,594
SPEED GOVERNOR
Arthur C. Allen, Chicago, Ill., assignor to Stewart-Warner Corporation, Chicago, Ill., a corporation of Virginia
Filed Mar. 23, 1961, Ser. No. 97,955
2 Claims. (Cl. 60—52)

This invention relates to engine speed governors and more particularly to engine speed governors for mobile or stationary applications wherein the engines are cooled by forced circulation liquid systems.

Speed governor systems usually comprise means for throttling the flow of fuel to the engine and speed sensing means in servo connection therewith for controlling the state of the throttling means in response to the engine speed. There are, of course, many different types of engine speed governors which have been developed for various applications, the requirements of which are usually dictated by the size and particular application of the motors as well as the available facilities on the motors which lend themselves as control parameters for speed sensing devices.

Heretofore, the speed governors have been developed as special auxiliary items directed toward the control of a particular engine. They have been designed to meet specific needs and, hence, have not been readily adaptable to other applications. For example, the commonly used velocity type speed governor utilizes a butterfly valve operating on an off-center shaft and is used both as a speed senser and control element. A greater velocity of the incoming fuel air mixture tends to rotate the valve closed against a biasing spring. Although the construction of such a governor is inexpensive for a particular motor application, it is readily apparent that the offset of the center of rotation and the calibration of the biasing spring are critical factors which must be tailored to the particular engine being controlled.

Another widely used type of engine speed governor is the centrifugal type in which the sensing signal is obtained by the centrifugal forces operating on a rotating mechanism. It is necessary that these governors be directly driven by the engine being controlled which limits their universal application. It is difficult, if not impossible, to provide means for rotating the centrifugal mechanism which can be used on a variety of types of engines.

It is, therefore, an object of this invention to provide an engine speed governor which may be used with a variety of engine types. More particularly, it is an object of this invention to provide a governor which has almost universal applicability to any engine having a forced circulation liquid coolant system. This is accomplished by providing a governor which controls the throttling of the fuel air mixture input by sensing signals obtained from pressure changes in the cooling system. Basically, the system operates by sensing the changes in pressure which result from changes in the speed of the coolant pump which is driven by the engine. In a forced circulation coolant system in which all variables other than the speed of the pumping means are eliminated, the relationship between the pressure in the system and the speed of the pump is a continuous function.

However, there are very few engines having forced circulation coolant systems in which pump speed is the only variable present. Most engines having forced circulation liquid coolant systems comprise separate heat exchanger means through which coolant flow may be selectively affected depending upon the operating state of the engine. For example, many internal combustion engines have a cooling system including a radiator in which the coolant flow through the radiator is blocked by a thermostat during the warmup of the engine or when the engine is operating in extremely cold temperatures. The operation of the thermostat materially affects the pressure in the engine coolant system because it changes the capacity of the flow path from the coolant pump. Also, a coolant system of this type generally has a pressure release cap on the radiator which is operable responsive to a predetermined vapor pressure rise to vent the system and prevent large pressures in the system. The operation of these devices introduce fluctuations in the system pressure which tend to reduce the effectiveness of pressure level as a control parameter for an engine speed governor. For these reasons there has been little development in pressure operated engine speed governors.

It is therefore an object of this invention to provide a coolant pressure operated engine speed governor in which the effects of non-continuous variables in the coolant system are minimized. Briefly, this object is accomplished by a device which senses variations in the pressure differential between two points in the coolant system rather than by sensing the variations in the absolute pressure in the system. Such a device comprises, essentially, a yieldable operating element such as a diaphragm and means defining a pair of fluid-tight chambers with the diaphragm means being a common element therebetween. One of the chambers is connected to a high pressure point in the coolant system and the other chamber is connected to a low pressure point. Prestressed biasing means such as a helical spring is disposed in the low pressure chamber and biases the diaphragm against movement towards the low pressure chamber so that the diaphragm will be deflected only when a predetermined level of pressure differential is reached corresponding to a desired minimum governing speed of the engine. A mechanical connection is provided between the diaphragm and engine throttle so that the deflection of the diaphragm will cause a change in the rate of feed of fuel to the engine.

It is another object of this invention to provide a novel engine speed covering device in which the governing speed is readily selectable without requiring disassembly of the device or the exchange of components therein. Specifically there is provided means providing a by-pass between the two chambers in the device including a controllable orifice which may be adjusted to determine the pressure differential between the chambers and hence the speed at which the governor takes control.

It is also an object of this invention to provide an engine speed governor actuator device which is simple in construction and requires no sealed bearing means for mechanically operating components connecting the diaphragm to the throttling means.

Other objects and advantages of this invention will become obvious to one skilled in the art upon a further reading of this specification especially when taken in view of the accompanying drawings in which.

Figure 1:
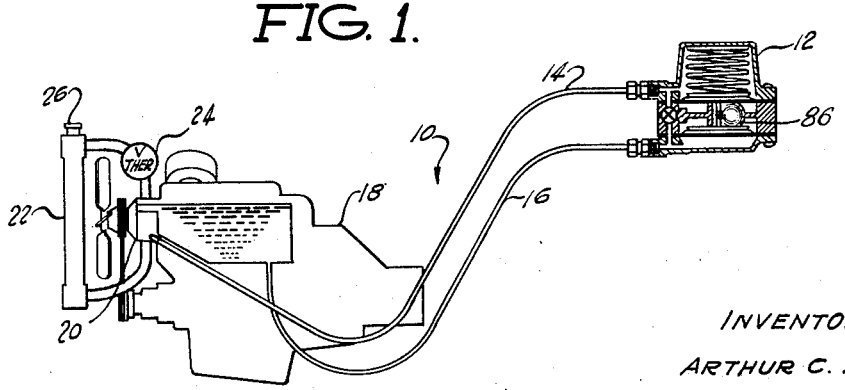
FIG. 1 is a schematic diagram of a preferred embodiment of the hydraulic operated governor system.

Referring now to FIG. 1 the engine speed governor system 10 comprises an actuator device 12 having connections 14 and 16 to low and high coolant pressure points respectively within the cooling system of internal combustion engine 18. The low pressure connection 14 terminates at the inlet side of coolant circulating pump 20 and the high pressure connection 16 terminates at a point along the path of the coolant within the block of engine 18. Most engines have a drain cock to expel the coolant from the block when desired, and this connection may be used as the high pressure source at which the high pressure connection 16 terminates. It is to be understood, however, that the high and low pressure connections may be made at any points within the coolant system from which representative high and low pressures may be obtained. The cooling system for the engine 18 is, in every other respect, an ordinary system comprising a radiator 22 through which parallel flow may be affected by a thermostatic valve 24 interconnected between the outlet of pump 20 and the inlet of radiator 22.

Figure 2:
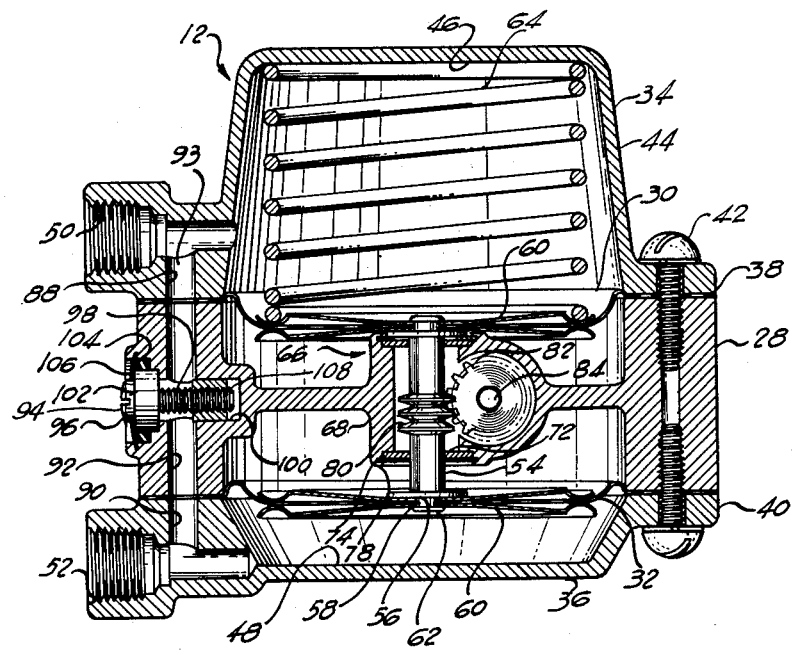
FIG. 2 is a vertical section of the actuator device for the governor system shown in FIG. 1.

The actuator device 12 as shown in detail in FIG. 2 includes a substantially annular casting 28 receiving at its upper and lower ends a diaphragm 30 and 32, respectively, and an end cap 34 and 36, respectively. Each of the diaphragms 30 and 32 have peripheral extensions 38 and 40, respectively, which are held in sealed relationship between the central casting 28 and its respective end cap 34 or 36. The central housing, diaphragms, and end caps are held in rigid assembly by a plurality of bolts 42 to form a housing 44 having a pair of fluid-tight chambers 46 and 48 each being defined by a diaphragm 30 or 32 and its associated end cap 34 or 36. Each of the end caps defines a threaded bore 50 and 52 to which are coupled the low pressure and high pressure connections 14 and 16, respectively.

Coolant from the forced circulation coolant system will, thus, be present in each of the chambers 46 and 48 at pressures corresponding to the low and high pressure on either side of the coolant pump 20.

The two diaphragms 30 and 32 are interconnected at their centers by a rigid member 54. The rigid member 54 has at each end a wide flange 56 and a stub extension 58 which protrudes through the respective diaphragm 30 and 32 and a distribution plate 60 on either side of each diaphragm. The ends of the stub extensions 58 at either end of the rigid member 54 are riveted at 62 to secure the two diaphragms and the member 54 in tight assembly so that the two diaphragms may act as a single yieldable element between the two chambers 46 and 48. Thus, when a high pressure appears in the chamber 48 with respect to the pressure in chamber 46 the two diaphragms with the rigid member 54 will tend to move in an upward direction, as viewed in FIG. 2.

A helical spring 64 is provided in the low pressure chamber 46 which is prestressed between the upper cover 44 and the distribution plate 60 adjacent the upper surface of the diaphragm 30. The spring 64 serves to prevent movement of the diaphragms in an upward direction until the force of the pressure differential between the chambers is sufficient to overcome the spring bias. The bias force of the spring 64 will therefore determine the minimum speed setting for the governor system.

The rigid member 54 is axially translatable within a supporting structure 66 formed in part by the central casting 28. The supporting structure 66 comprises a hub 68 within which the rigid member 54 is translatable and has a low friction bearing washer at either end thereof which are held in place by retaining washers 72 which in turn are secured by the rolled ends 74 of the hub 68.

The rigid member 54 carries a rack 80 which is engageable with a pinion gear 82 disposed within the hub 68. The pinion gear 82 is rigidly fixed to a rotatable shaft 84 which extends through the side of the central casting 28 and is journaled in suitable bearings (not shown) within the hub. The shaft 84 is mechanically linked to a butterfly valve 86 (FIG. 1) which serves as the auxiliary throttling control for the engine 18. Axial translation of the rigid member 54 responsive to changes in the pressure differential between the two chambers 46 and 48 will cause the pinion 82 and hence the butterfly valve 86 to rotate thereby varying the feed of the fuel-air mixture to the engine 18 to control its speed.

It will be noted that the mechanical structure translating the motion of the diaphragms to the butterfly valve is all located within the central portion of the housing which is sealed from the forced circulation coolant system. The mechanical structure is not subjected to the corrosive action of the coolant and the need for bearing seals for the rotatable shaft 54 is eliminated. This substantially reduces the costs in constructing the device and serves to increase the operating life of the device. It is to be understood that the end caps 34 and 36 may be fabricated of any structurally sound material but it is preferable that they be formed of a non-corrosive material such as plastic.

The upper and lower covers 44 and 48 and the central casting 28 have axially aligned apertures 88, 90 and 92 respectively which form a by-pass 93 between the two chambers 46 and 48. Variable orifice means 94 are provided within the central casting 68 to vary the flow through the by-pass 93 between the two chambers. The variable orifice means 94 comprises a screw 96 having a threaded portion 98 extending into a recess 100 transversely intersecting the by-pass 93. The screw 96 also has an enlarged collar 102 which cooperates with an O-ring 104 and washer 106 to prevent axial movement of the screw and to retard its rotational movement. A plug member 108 threadedly engages the screw 96 and is axially translatable along the length of the screw thread portion 98 responsive to rotation of the screw 96 to control the flow of coolant therepast.

Figure 3:
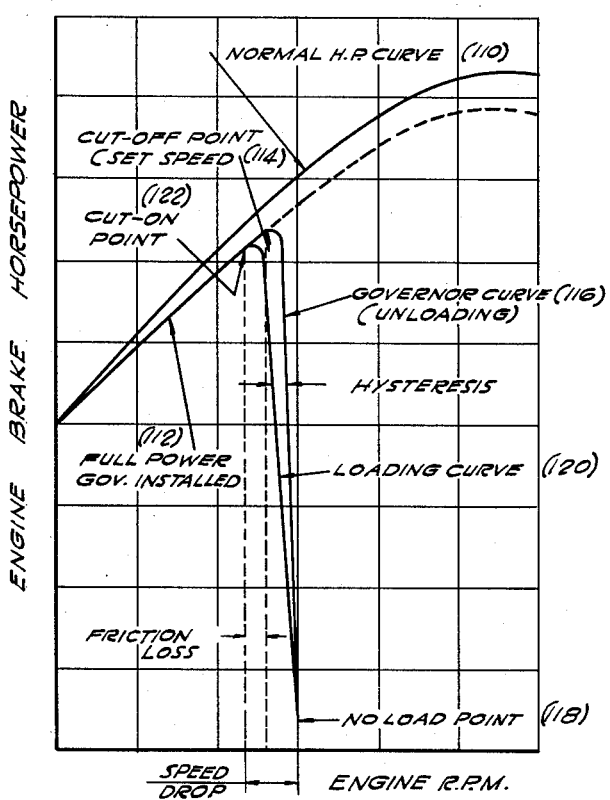
FIG. 3 is a graphic representation showing the response of the engine brake horsepower to the engine speed with the governor system of this invention.

Having described in detail the speed governing system its performance features may be discussed with reference to the horsepower vs. speed curve of the engine shown in FIG. 3. When no governor is present the power developed by the engine at wide open carburetor throttle and varying load will be as shown at 110 on the graph of FIG. 3. When a governor is present, however, a slight power loss will be experienced even though the butterfly is in the wide open position because the presence of the plate edge and shaft produce a partial restriction to the flow which affect distribution and block the quantity of incoming charge. The affects of the presence of the auxiliary throttle valve is shown by the curve 112 in the graph.

When the governing speed or cutoff point represented by point 114 on the graph is reached, closure of the auxiliary valve causes a decrease in horsepower. The incoming energy, which is the fuel air mixture, is adjusted to balance the outgoing mechanical energy to the load so that the speed will remain nearly constant. If the load on the engine is decreased or the operator controlled throttle is opened further, there will be a tendency for the engine to increase speed which will also speed the operation of the coolant pump to cause an increase in the pressure differential between the two chambers to the governor actuator unit 12. This pressure differential operates to rotate the auxiliary throttle valve reducing the engine brake horsepower output and stabilizing the engine operation at a speed slightly above the cutoff speed somewhere along the portion 116 of the curve between the cutoff point 114 and no load point 118. The cutoff point or the beginning point of governing is quite sharp with this governor which is a desirable feature because it allows maximum power up to the governing speed with minimum distribution interference.

When the engine is running at a point above the cutoff speed 114 and somewhere along the unloading portion 116 of the curve and more load is added or the operator controlled throttling is reduced, the engine will operate along the loading curve 120 in its return to the full power curve. It will be noted that the cut-on point 122, which represents the point where the loading curve and the full power curve intersect, is slightly removed from the cutoff point 114 representing a hysteresis loss in the system due to friction of the mechanical parts of the governor. Normal precautions may be taken in the selection of component materials and the mechanical structure of the governor to reduce the friction loss to a minimum.

The total variation in speed from the no-load point 118 to the cut-on point 122, called the speed droop or regulation when expressed as a percentage of governing speeds, is small with this particular type governor, at least when the governing speed is low and there is little if any coolant flow through the by-pass between the two chambers of the governor actuator. This is important because the regulation is a measure of the effectiveness of the governor to maintain a constant speed which is an indication of the governor's accuracy.

Figure 4:
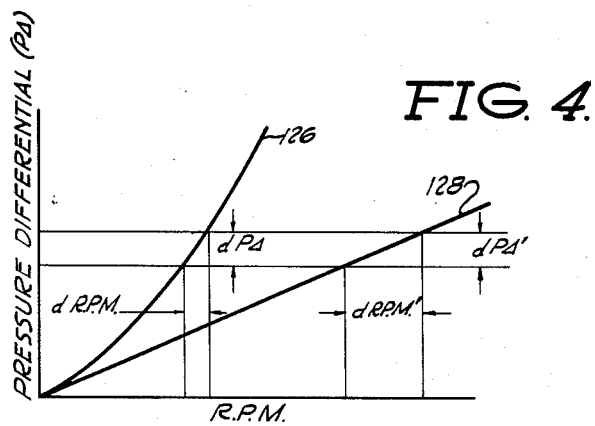
FIG. 4 is a graphic representation showing the regulation of the hydraulic speed governor system.

It has been found, however, that, when higher governing speeds are desired requiring larger openings in the by-pass between the two chambers, the regulation has a tendency to fall off somewhat. This can be attributed to pressure losses in the low and high pressure connections 14 and 16 due to the increase in coolant flow therethrough. When the by-pass in the actuator device is completely closed, the relationship between the pressure differential between the two chambers and the speed of the engine is as represented by curve 126 in FIG. 4. The pressure differential is found to be between a second and third order function, of the engine speed so that the slope $$\frac{d\Delta P}{dRPM}$$

representing the change in pressure differential per increment in speed is quite substantial over the greater part of the curve. As the by-pass is opened, however, the function of the pressure differential with the engine speed changes to approach a linear function as shown by the curve 128 in FIG. 4. The slope of the curve 128 is substantially lower than the slope of the curve 126 at any point therealong indicating that the regulation is poorer, as the governing speed is increased by opening the by-pass.

It has been found that the slope of the curve 128 at the higher speeds may be increased quite substantially by restricting the flow of coolant through the governor system at all speeds by using a smaller conduit in the connection 14 between the input of the pump 20 and the low pressure chamber 46. By so doing the pressure loss in the high pressure connection 16 is reduced due to the reduction in flow so that the pressure differential between the chambers 46 and 48 more nearly coincides with the pressure differential between the input of the pump 20 and the engine block 18.

It is to be noted that the governor system of this invention is readily adaptable to a wide variety of engines without requiring major modifications. The speed adjustment valve has a wide range of adjustment so that engines with lower or higher coolant pressure characteristics can be accommodated by using correspondingly smaller or greater valve openings. If a case arises where modifications are required, they may be accommodated by merely changing the force rate and preload force of the spring 64 in the low pressure chamber 46. The data for these changes can easily be obtained by attaching a dummy governor to the engine that requires governing and recording of the pressure differential at different speeds and by-pass settings.

The above described method of adaptation is much simpler than the one necessary for the velocity type governor. With the velocity governor torque values at different butterfly valve angles and engine speeds must be recorded. The spring mechanism must then be designed to counteract these torque values so that stable operation is obtained. This involves the tedious trial and error process because the restraining torque characteristics of the mechanism cannot be accurately predicted for a given change in the linkage. After a change in the linkage is made further adjustments must be made on the actual engine until desired performance is obtained.

While there has been described a preferred embodiment of the invention, it is recognized that many changes and modifications may be made thereto which will nevertheless adhere to the spirit of this invention. It is, therefore, contended that the invention be limited only by the scope of the appending claims.

What is claimed is:

1. A governor for an internal combustion engine in a system having a pump with an inlet and an outlet for translating liquid coolant, said governor comprising a carburetor butterfly valve, an actuator for said valve comprising a housing, a first diaphragm within said housing defining a low pressure chamber between one surface thereof and said housing, a second diaphragm within said housing parallel to and spaced from said first diaphragm and defining a high pressure chamber between one surface and said housing, a helical spring in said low pressure chamber in prestressed engagement between the associated diaphragm and said housing, a rigid member enclosed within said housing and interconnecting the centers of said diaphragms, a rack on said member, pinion and shaft means in operable engagement with said rack and operably connected to said valve, means including a controllable orifice exterior of said chambers for interconnecting said chambers, said last mentioned means comprising a first conduit between said low pressure chamber and the pump inlet and a second conduit between the high pressure chamber and pump outlet, said first conduit having a substantially smaller flow diameter than said second conduit.

2. A governor for an internal combustion engine in a system having a pump with an inlet and an outlet for translating liquid coolant, said governor comprising a carburetor butterfly valve, an actuator for said valve comprising a housing, a first diaphragm within said housing defining a low pressure chamber between one surface thereof and said housing, a second diaphragm within said housing parallel to and spaced from said first diaphragm and defining a high pressure chamber between one surface and said housing, a helical spring in said low pressure chamber in prestressed engagement between the associated diaphragm and said housing, a rigid member enclosed within said housing and interconnecting the centers of said diaphragms, a rack on said member, pinion and shaft means in operable engagement with said rack and operably connected to said valve, a first conduit between said low pressure chamber and the pump inlet and a second conduit between the high pressure chamber and the pump outlet, said first conduit having a substantial smaller flow diameter than said second conduit.

References Cited in the file of this patent

UNITED STATES PATENTS

| | | |
|---|---|---|
| 1,347,276 | Johnson | July 20, 1920 |
| 1,571,977 | Trotter et al. | Feb. 9, 1926 |
| 1,957,697 | Conway | May 8, 1934 |
| 2,105,473 | Dean | Jan. 18, 1938 |
| 2,202,836 | Coupland | June 4, 1940 |
| 2,331,337 | Meyer | Oct. 12, 1943 |
| 2,450,199 | Leibing | Sept. 28, 1948 |
| 2,658,525 | Shannon | Nov. 10, 1953 |
| 2,800,771 | Madison | July 30, 1957 |
| 2,869,565 | Cliborn | Jan. 20, 1959 |
| 2,969,776 | Riester | Jan. 31, 1961 |